(12) United States Patent
Rittmeyer et al.

(10) Patent No.: US 7,509,385 B1
(45) Date of Patent: Mar. 24, 2009

(54) METHOD OF SYSTEM FOR CREATING AN ELECTRONIC MESSAGE

(75) Inventors: Kathrin Rittmeyer, Berlin (DE); Michael Schimko, South Melbourne (AU); Sebastian Thomschke, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,824

(22) Filed: May 29, 2008

(51) Int. Cl.
*G06F 15/16* (2006.01)
*G06F 17/27* (2006.01)

(52) U.S. Cl. .................................. 709/206; 715/224
(58) Field of Classification Search ................. 709/206; 715/224

See application file for complete search history.

(56) References Cited

U.S. PATENT DOCUMENTS

| | | |
|---|---|---|
| 2002/0087404 A1 | 7/2002 | Silkey et al. |
| 2007/0079248 A1 | 4/2007 | Finke et al. |
| 2008/0059874 A1* | 3/2008 | Spencer ..................... 715/235 |

FOREIGN PATENT DOCUMENTS

| | | |
|---|---|---|
| EP | 1 001 359 A2 | 5/2000 |
| EP | 1 241 610 A2 | 9/2001 |

* cited by examiner

*Primary Examiner*—Kenny Lin
(74) *Attorney, Agent, or Firm*—Dillon & Yudell LLP

(57) ABSTRACT

A method of creating an electronic message from a sender to a recipient suggests a salutation. The method may search for the recipient in the sender's address book for an address book salutation, e-mail folders for an e-mail salutation, chat logs for a chat salutation, and/or organization directory for a hierarchical salutation. If the method finds at least one of the address book salutation, the e-mail salutation, the chat salutation, or the hierarchical salutation, the method suggests a salutation to the sender. If the method cannot determine the address book salutation, the e-mail salutation, the chat salutation, and the method attempts to deduce a name of the recipient. If the method fails to deduce the name of the recipient, the method suggests a default salutation. If the method deduces the name of the recipient, the method attempts to deduce a country of residence for the recipient. If the method fails to deduce a country of residence for the recipient, the method suggests a salutation using the name of the recipient. If the method deduces the country of residence, the method suggests a salutation using the name of the recipient and a greeting appropriate for the country of residence.

1 Claim, 6 Drawing Sheets

METHOD OF SYSTEM FOR CREATING AN ELECTRONIC MESSAGE

BACKGROUND OF THE INVENTION

1. Technical Field

The present invention relates in general to the field of electronic communication, and more particularly to a method of and system for suggesting salutations in e-mail messages, and the like.

2. Description of the Related Art

Electronic communication, such e-mail, has become for most people the most common form of written communication. People are getting busier all the time. In the business world, people may have to write and/or respond to tens or even hundreds of e-mail messages every day. The time required to write or respond to current volumes of e-mail can be extreme. Any tool that reduces the time required to generate an e-mail message would be welcome.

SUMMARY OF THE INVENTION

The present invention provides a method of creating an electronic message from a sender to a recipient. The method determines the recipient and searches an address book of the sender for the recipient. If the recipient is listed in the address book, the method determines if the address book includes an address book salutation for the recipient. The method also searches e-mail folders of the sender for messages from the sender addressed to the recipient. If the e-mail folders include messages addressed to the recipient, the method determines an e-mail salutation used for the recipient. The method also searches chat logs of the sender for chat between the sender and the recipient. If the chat logs include chat between the sender and the recipient, the method determines a chat salutation used for the recipient. The method also searches for the recipient in an organization directory including the sender. If the recipient is in the organization directory, the method determines a hierarchical relationship between the sender and the recipient and forms a hierarchical salutation for the sender based on the hierarchical relationship. If the method determines at least one of the address book salutation, the e-mail salutation, the chat salutation, or the hierarchical salutation, the method suggests a salutation to the sender. If the method cannot determine the address book salutation, the e-mail salutation, the chat salutation, and the method attempts to deduce a name of the recipient. If the method fails to deduce the name of the recipient, the method suggests a default salutation. If the method deduces the name of the recipient, the method attempts to deduce a country of residence for the recipient. If the method fails to deduce a country of residence for the recipient, the method suggests a salutation using the name of the recipient. If the method deduces the country of residence, the method suggests a salutation using the name of the recipient and a greeting appropriate for the country of residence.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
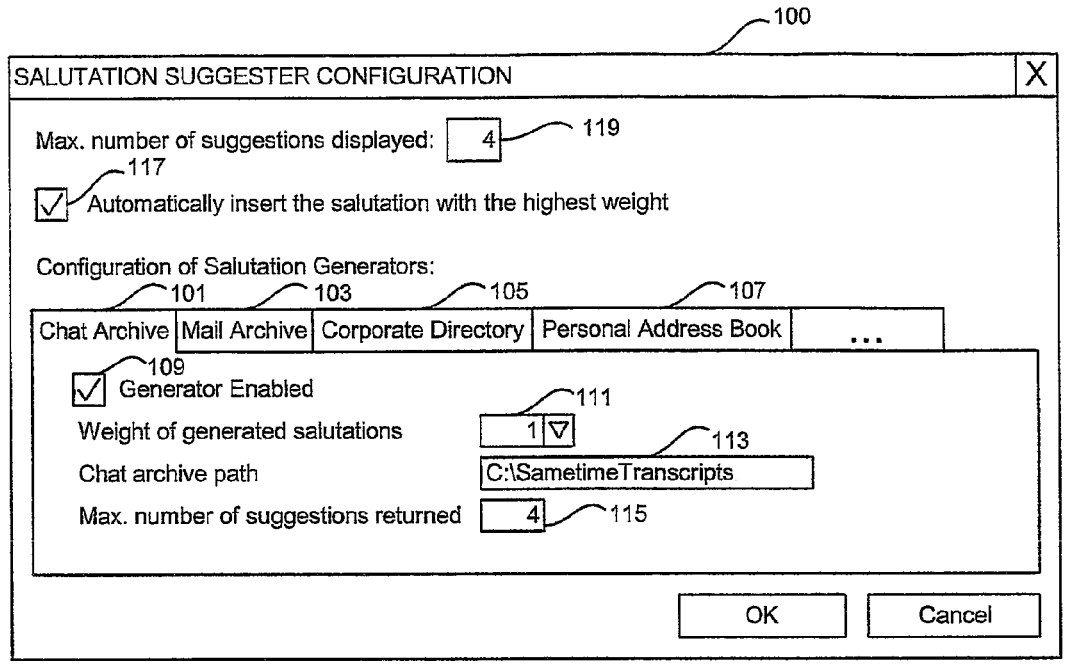
FIG. 1 is a pictorial view of an embodiment of a salutation suggester configuration window according to the present invention.

The present invention provides a method of and system for suggesting salutations in e-mails and the like to users by searching systems and data on the user's computer. In some embodiments of the present invention, the search for salutations is configurable. FIG. 1, illustrates an embodiment of a salutation suggester configuration window, which is designated generally by the numeral 100. As will be explained in detail hereinafter, configurable salutation generators may be associated with a user's chat archive 101, mail archive 103, corporate directory 105, personal address book 107, etc. As shown with respect to chat archive 101, a checkbox 109 is provided whereby they generator for chat archive may be enabled. Salutations generated by the salutation generator may be weighted. The weighting accorded to a generated salutation is configurable by inserting a number into a field 111. The path to the data to be searched is inserted into entry field 113. The user can configure the maximum number of suggestions returned by entering a number into a field 115. The user may configure the salutation suggester either to automatically insert the salutation with the highest weight by checking a checkbox 117 or to display a maximum number of suggestions by entering a number into an entry box 119.

Figure 2:
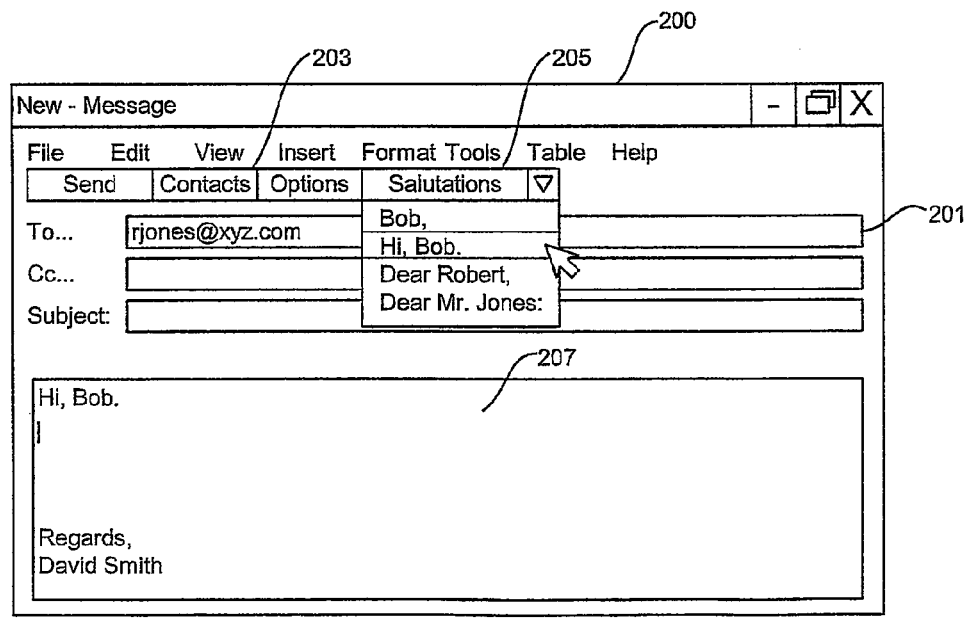
FIG. 2 is a pictorial view of an embodiment of an electronic mail new message window processing according to the present invention.

FIG. 2 illustrates an embodiment of a new e-mail message window 200. The salutation suggester according to the present invention is triggered by entering an e-mail address into a "To" entry field 201. The salutation suggester may also be triggered by selecting a reply function (not shown) in another e-mail message. As will be explained in detail hereinafter, triggering the salutation suggester causes the suggester to search data of the user in accordance with configuration information. In the embodiment of FIG. 2, an action bar 203 includes a salutations choice 205. Selection of salutations choice 205 drops down a list of returned salutations in weight order. The user can select a salutation by clicking on a desired selection, which causes the system to insert the selected salutation in the body 207 of the e-mail. As described with respect to FIG. 1, the salutation suggester of the present invention may be configured to insert the returned salutation with the highest weight automatically, without suggesting a choice from salutations action 205.

Figure 3:
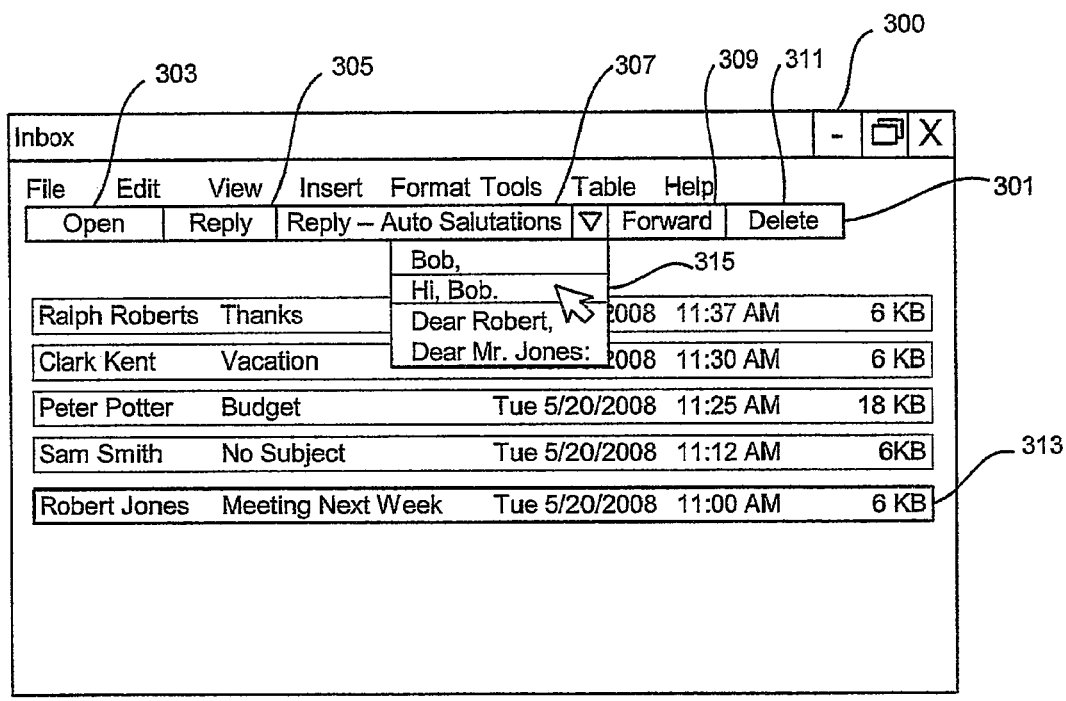
FIG. 3 is a pictorial view of an embodiment of an electronic mail inbox window according to the present invention.

FIG. 3 illustrates an embodiment of an e-mail inbox window 300. Window 300 includes a row 301 of action buttons, which include an "Open" button 303, a "Reply" button 305, a "Reply —Auto Salutations" button 307, a "Forward" button 309, and a "Delete" button 311. Window 300 displays incoming e-mail messages, including a message 313 from "Robert Jones." A user can perform an action on a message by selecting the message and actuating an action button. According to the present invention, a user can invoke a reply to, for example "Robert Jones", with a suggested salutation by selecting message 313 and actuating "Reply —Auto Salutation" button 307. Actuation of button 307 produces a drop-down list 315 of suggested salutations, formed according to the present invention. When the user selects a suggested salutation from drop-down list 315, the system opens a reply e-mail message window addressed to the selected recipient and with the selected salutation inserted automatically.

Figure 4A:
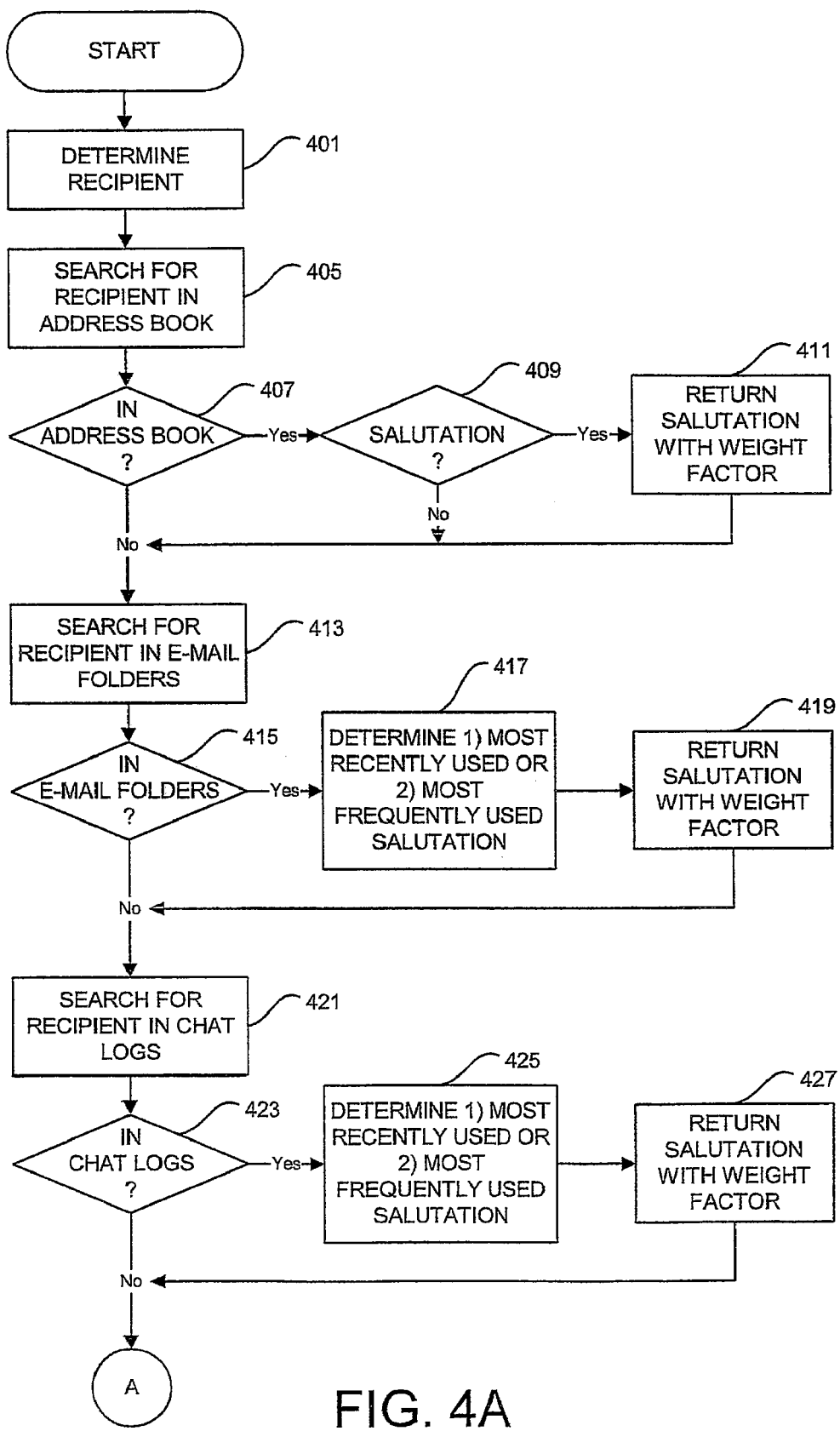
FIG. 4A - FIG. 4B comprise a flow chart of an embodiment of salutation suggestion processing according to the present invention.
Figure 4B:
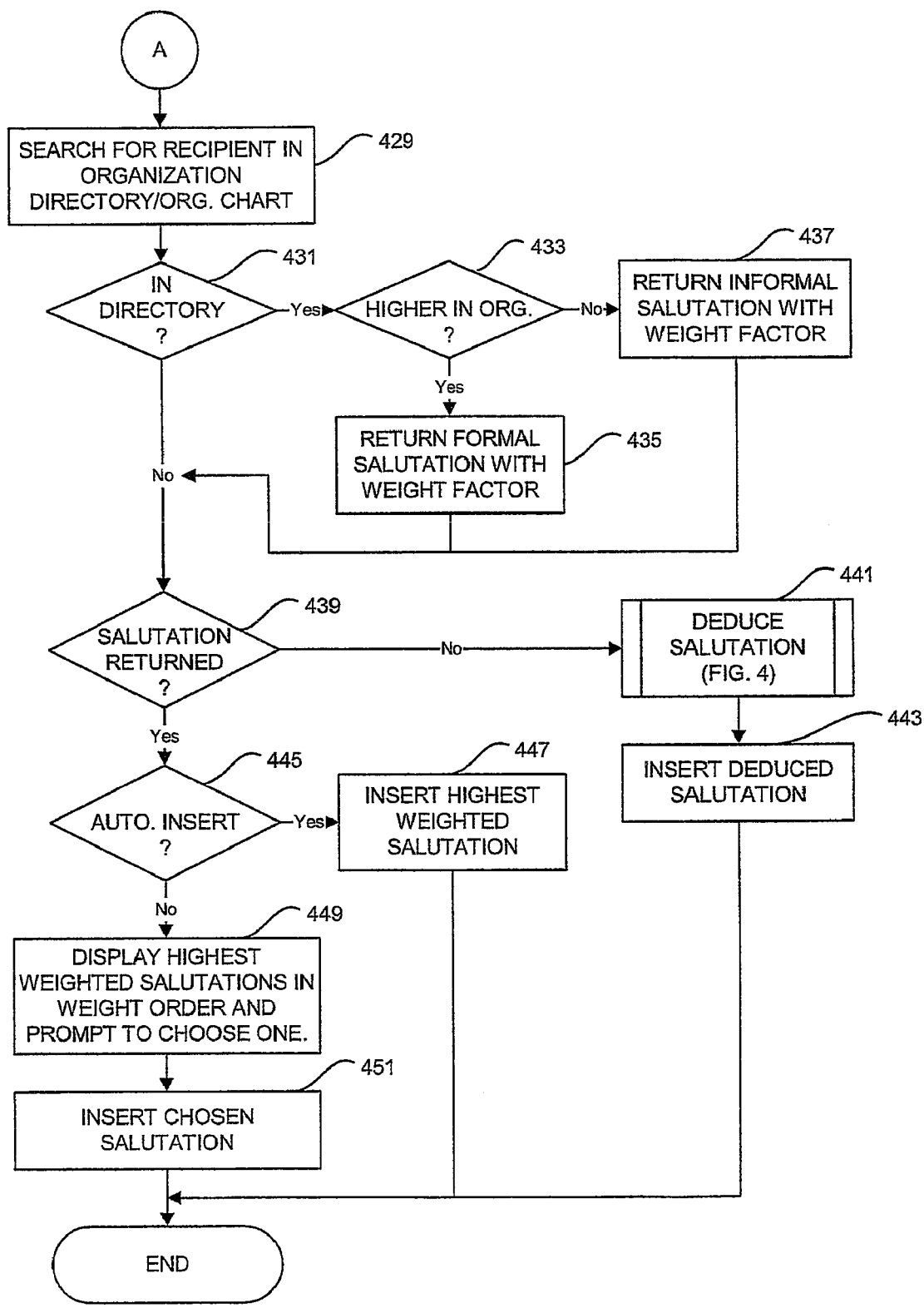

FIGS. 4A and 4B comprise a flow chart of an embodiment of salutation suggestion according to the present invention. The system determines a recipient, at block 401. The recipient is determined with reference to an e-mail address. The system searches for the recipient in the user's address book, at block 405. If, as determined at decision block 407, the recipient is in the user's address book, the system determines, at decision block 409, if the address book entry for the recipient includes a salutation. If so, the system returns the salutation with the configured weight factor, at block 411.

After having searched the user's address book, the system searches for the recipient in the user's e-mail folders, as indicated at block 413. If, as determined at decision block 415, the user's e-mail folders include e-mail to the recipient, the system determines either the most recently used salutation or the most frequently used salutation, at block 417, depending upon the configuration of the suggester system, and returns the salutation with the configured weight factor, at block 419. Then, the system searches for the recipient in the user's chat logs or archives, as indicated at block 421. If, as determined at decision block 423, the user's chat logs include chat with recipient, the system determines either the most recently used salutation or the most frequently used salutation, at block 425, depending upon the configuration of the suggester system, and returns the salutation with the configured weight factor, at block 427.

Referring to FIG. 4B, after having searched the users chat logs, the system may search for the recipient in the user's organization directory or organization chart, as indicated at block 429. If, as determined at decision block 431, the recipient is in the user's organization directory, the system determines, at decision block 433 if the recipient is higher in the organization than the user. If so, the system returns a formal salutation with the configured weight factor, at block 435. If the recipient is not higher in the organization and the user, the system returns an informal salutation with the configured weight factor, at block 437.

After having searched the organization data, the system determines, at decision block 439, if any salutations have been returned. If not, the system performs salutation deduction processing, indicated generally at block 441 and described in detail with reference to FIG. 4. The system inserts the deduced the salutation, at block 443 returning to decision block 439, if one or more salutations have been returned, the system determines, at decision block 445, if automatic insert (check box 117 of FIG. 1) has been enabled. If so, the system inserts the highest weighted salutation, at block 447, and processing ends. If, as determined at decision block 445, automatic insert has not been enabled, the system displays the highest weighted salutations in weight order and prompts the user to choose one, as indicated at block 449. After you the user chooses a suggested salutation, the system inserts the chosen salutation, at block 451, and processing ends.

Figure 5:
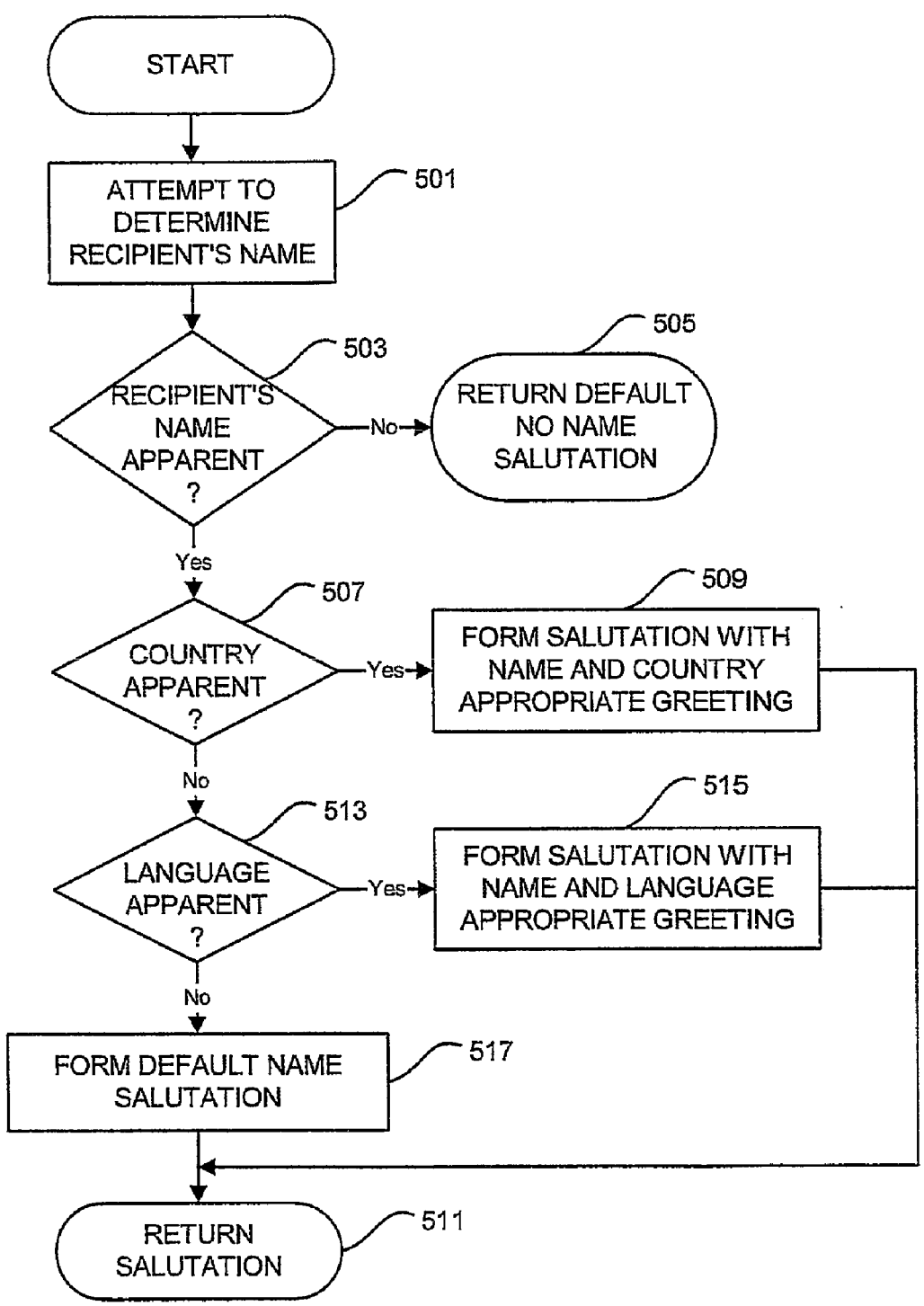
FIG. 5 is a flow chart of an embodiment of salutation deduction processing according to the present invention; and, FIG. 6 is a flow chart of an alternative embodiment of processing according to the present invention.

FIG. 5 is a flow chart of an embodiment of salutation deduction according to the present invention. Salutation deduction is invoked if searches of the user's data yield no suggested salutations. The system attempts to determine the recipient's name from the recipient's e-mail address, at block 501. In some cases, the recipient's name is obvious from the e-mail address. An example of a name being obvious from an e-mail address is "John Smith <js1@abc.org>." An example of the name being readily apparent from an e-mail address is "William_Jones@abc.org." As is apparent to those skilled in the art, suitable heuristics may be provided for parsing an e-mail address and determining the name of the recipient. If, as determined at decision block 503, the system cannot determine the recipient's name, the system returns to a default "no name" salutation, as indicated at block 505. A default no-name salutation, such as "Hello:" is configurable.

If, as determined at decision block 403, the system can determine the recipient's name, the system may determine, at decision block 507, if the recipient's country is apparent. The system may be configured to form a salutation appropriate for the country where the recipient is located. For example, if the domain of the recipient's e-mail address is "de.abc.com" it may be inferred that the recipient is located in Germany. An appropriate German greeting is "Hallo." Other examples of appropriate greetings include "Hi" in the United States, "Hello" in the United Kingdom, "Hej" in Sweden, etc. If, as determined at decision block 507, the recipient's country is apparent, the system forms a salutation including the recipient's name and the country appropriate greeting, as indicated at block 509, and returns the salutation, at block 511.

If the system is unable to determine the recipient's country, the system may attempt to determine the recipient's language, at decision block 513. This feature is useful when replying to an e-mail from the recipient. The system may include language recognition algorithms that can distinguish between various languages, such as English, German, Swedish, etc. If, as determined at decision block 513, the recipient's language is apparent, the system forms a salutation with the recipient's name and a language appropriate greeting, at block 515. If the language of the recipient is not a parent, the system forms a default "name" salutation, such as "Hi, Bob," at block 517.

Figure 6:
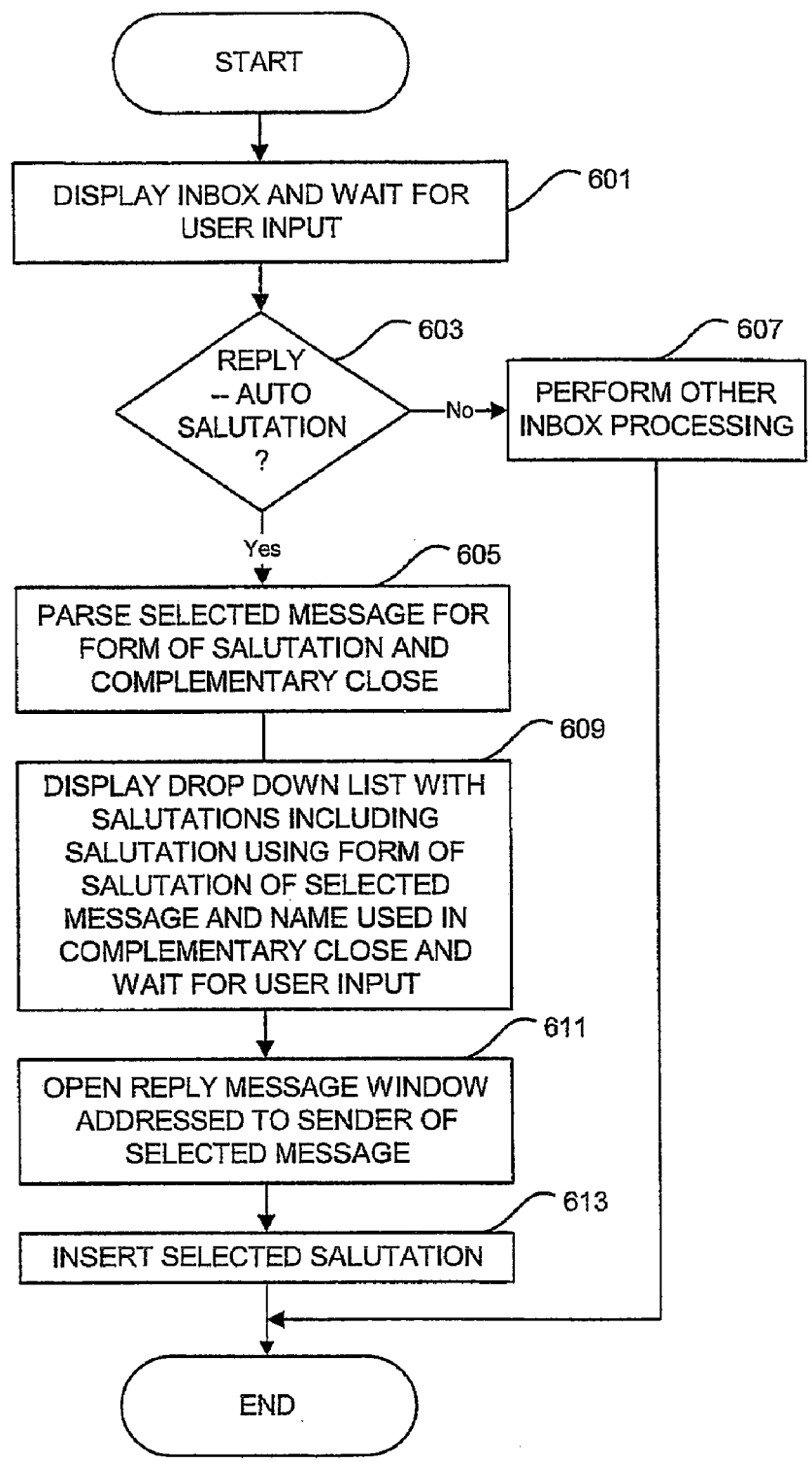

FIG. 6 is a flow chart of an alternative embodiment of the present invention that is particularly useful in connection with the inbox of FIG. 3. The system displays an inbox and waits for user input, at block 601. If, as determined at decision block 603, the user input is "Reply —Auto Salutations" the system parses the selected message for the formal citation and complementary close, as indicated at block 605. If the user input is not "Reply —Auto Salutations" the system performs other inbox processing, as indicated generally at block 607. After parsing the selected message, at block 605, the system displays a drop-down list of salutations including a salutation using the formal salutation of the selected message and the name used and complementary close, at block 609. The system may generate other suggested salutations using the method of FIGS. 4A and 4B. The system waits for user input. When the user selects a salutation from the drop-down list, the system opens reply message window addressed to the sender of the selected message, at block 611, and inserts the selected salutation, at block 613.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of creating an electronic message from a sender to a recipient, which comprises:
   determining said recipient;
   searching an address book of said sender for said recipient;

if said recipient is listed in said address book, determining if said address book includes an address book salutation for said recipient;

searching e-mail folders of said sender for messages from said sender addressed to said sender;

if said e-mail folders include a message addressed to said recipient, determining an e-mail salutation used for said recipient;

searching chat logs for of said sender for chat between said sender and said recipient;

if said chat logs include chat between said sender and said recipient, determining a chat salutation used for said recipient;

searching an organization directory including said sender for said recipient;

if said recipient is in said organization directory, determining a hierarchical relationship between said sender and said recipient;

forming an hierarchical salutation for said sender based on said hierarchical relationship;

if at least one of said address book salutation, said e-mail salutation, said chat salutation, or said hierarchical salutation is determined, suggesting a salutation to said sender;

if said address book salutation, said e-mail salutation, said chat salutation, and said hierarchical salutation cannot be determined, attempting to deduce a name of said recipient;

if said name of said recipient cannot be deduced, suggesting a default salutation;

if said name of said recipient can be deduce, attempting to deduce a country associated with said recipient;

if a country of associated with said recipient cannot be deduced, suggesting a salutation using said name of said recipient; and, if said country associated with said recipient can be deduced, suggesting a salutation using the said name of said recipient and a greeting appropriate for said country;

determining a country of residence of said recipient;

forming a country of residence salutation for said recipient based upon said country of residence;

forming a default salutation for said recipient; and, selecting one salutation from said address book salutation, said chat salutation, said hierarchical salutation, said country of residence salutation, and said default salutation; and, inserting said selected salutation into said electronic message.

* * * * *